July 31, 1934. E. TYDEN Re. 19,261
TEMPERATURE RESPONSIVE DEVICE
Original Filed June 30, 1930
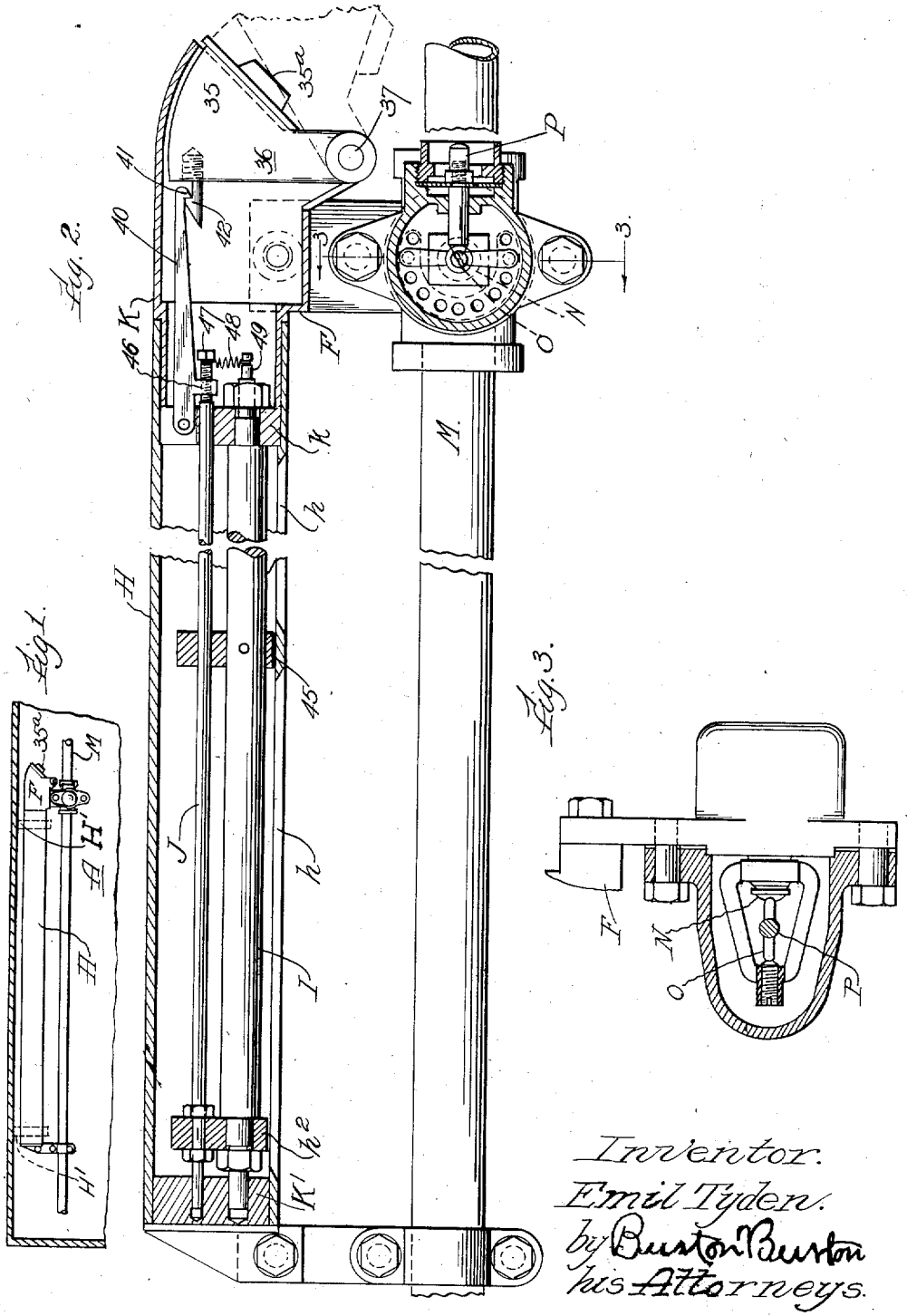
Inventor:
Emil Tyden.
by Burton Burton
his Attorneys.

Reissued July 31, 1934 Re. 19,261

UNITED STATES PATENT OFFICE 19,261

TEMPERATURE RESPONSIVE DEVICE

Emil Tyden, Hastings, Mich.

Original No. 1,856,274, dated May 3, 1932, Serial No. 464,946, June 30, 1930. Application for reissue March 3, 1934, Serial No. 713,942

7 Claims. (Cl. 297—12)

The purpose of this invention is to provide an improved temperature-responsive device for controlling the operation of any apparatus whose functions are required or conditioned upon the occurrence of certain temperature conditions at the locality of the temperature-responsive device. It is particularly designed for controlling the operation of a fire extinguishing apparatus installed in a building to be protected, and it is accordingly shown in the form and dimensioned suitable for installation in the apartment to be protected, in connection with a fire extinguishing apparatus installed therein. It consists of the elements and features of construction shown and described, as indicated in the claims.

In the drawing:

Figure 1 is an elevation of an apparatus embodying the invention shown in connection with the cooperating elements of a fire extinguishing installation.

Figure 2 is a partly sectional view of the structure shown in Figure 1 upon an enlarged scale, section being made in vertical plane axial with respect to the part indicated at H in Figure 1.

Figure 3 is a section at the line 3—3 on Figure 2.

The device of the invention may be described in general terms as consisting of two metal bars or rods of the same metal or metals, having substantially the same thermal coefficient, but of widely different cross section, the two bars being mounted side by side for like exposure to the local temperature, the bars being held fixed with respect to each other by supporting means at one end and relatively movable longitudinally at their opposite ends; so that when a rapid rise of temperature occurs, the thinner bar being quickly heated through its entire cross section, is elongated a substantial amount before the greater bar becomes heated through a sufficient portion of its diameter or thickness to manifest any appreciable elongation; and a movable part whose position at two points in its length is determined by the position of the ends of the two bars respectively, will be displaced by movement of the point of action on it of the lesser bar; and the resulting change of position of said movable part is utilized to actuate a cooperating part of the instrument or apparatus which it is the function of the temperature-responsive device to control.

Referring to the drawing for detail description: The walls and ceiling of an apartment in which fire protective apparatus is installed and arranged to be controlled by a device embodying this invention, are indicated at A. Mounted near the ceiling of the apartment is a housing H, substantially tubular, but open at the lower side for the greater part of its length, as indicated at *h*, said housing being mounted and secured in any convenient manner by attachment to the wall or ceiling of the apartment, as by hangers or brackets, $H^1$, $H^1$.

The housing, H, carries a pair of metal rods, I and J, the rod, I, being of relatively large diameter, and the rod, J, being relatively slender. In order to operate for the purpose for which the rods are thus differentially dimensioned, the cross section of the larger rod should be at least fifty percent greater than that of the lesser rod. Much greater difference, as shown, is unobjectionable, and under some conditions, preferable. Both rods are made fast at one end in a cross bar, $h^2$, proximate to a head plate, $K^1$, of the housing in which the rods, I and J, are slidingly mounted at their ends beyond said cross bar. The housing has mounted in it at the other end a bracket member, K, formed with a web, *k*, which constitutes the head plate of the housing at that end and in which the rod, I, is fixed and the rod, J, carried slidingly. The bracket, K, may constitute the support for a fitting, F, hereinafter identified as part of the installation of the fire extinguishing apparatus with a member of which the device of the invention is to cooperate, as hereinafter explained. And as shown, said bracket is integral with said fitting, F. The bracket is extended for affording pivotal support, as seen at 37, for a weighted lever, 36, which extends upwardly from its pivot with the weight, 35, overhanging from the pivot; and said weighted lever is held normally at the position indicated against gravity by a latch member, 40, pivoted at one end of the web, *k*, of the bracket, K, and having at the other end a catch nose, 41, which engages a catch, 42, carried by the lever, 36, as seen in Figure 2.

At suitable place or places in the length of the rods, I and J, the housing, H, is furnished with suitable guide bearing for both rods, as indicated by one such guide bearing, 45, to prevent the rods or either of them from sagging by their own weight, as they might be liable to do when heated.

The operation of this structure in its response to temperature, which is that upon slow change of temperature, the two rods, I and J, acquire the changed temperature substantially at the same rate; and being of the same metal they are lengthened or shortened equally in change of temperature which occurs slowly. But in the case of temperature due to fire in the apartment and consequently taking place rapidly, the slender rod becomes heated through so as to expand longitudinally before the larger rod is nearly heated to more than a small fraction of its diameter, or before it is heated to a sufficient fraction of the diameter to cause it to show any appreciable elongation.

The latch member, 40, has near its pivot a depending lug, 46, which carries a screw, 47, for encountering the end of the rod, J, which protrudes through the web, *k*, of the bracket, K; said screw affording attachment for one end of a spring, 48, attached at its other end to a fixed stud, 49, and operating to hold the lug against the end of the rod, J; and with this construction it may be readily understood that when the rod, J, by its elongation, in advance of any substantial elongation of the rod, I, is thrust through the web, *k*, which is held by the heavier rod, I, unmoved in the housing, the engagement of the rod, J, with the end of the screw, 47, in the lug, 46, of the latch causes the latch nose to be disengaged from the catch, 42, thus releasing the weighted lever, 36, causing the weight, 35, by a boss, 35[a], with which it is provided in the center, to encounter a cooperating member of the adjacently installed part of the fire extinguishing apparatus, and operate the latter for effecting the desired control of the fire extinguishing apparatus.

The particular character of these cooperating elements of the fire extinguishing apparatus, of course, form no part of this invention, but may be described for the purpose of making clear the operation of the thermostatic temperature-responsive device. And the same are accordingly shown in Figure 3, from which it may be understood that a pipe line, M, which serves as a conduit for fluid pressure, being in the particular fire extinguishing apparatus utilized for this illustration the air pressure in the discharge line of a dry pipe valve system, has mounted in it for controlling the air pressure of air flow therethrough, a valve, N, which is held closed by a displaceable strut, O, (as shown displaceable by breaking) a thrust pin, P, carried by a flexible or otherwise slightly movable wall member of the valve chamber is arranged at its inner end for breaking the strut, its outer end being exposed for encounter with the weight of the temperature-responsive device when the latter falls upon being released by the operation of said device as above described.

I claim:

1. A temperature-responsive device comprising a pair of bars of substantial length, a supporting structure in which said bars are mounted extending longitudinally in the same general direction, one of said bars being at least fifty percent greater in cross section than the other, the supporting structure comprising a fixed head at each end, the two bars being mounted fixedly with respect to each other at their end portions which extend toward one of said fixed heads, the greater bar being mounted fixedly at the other end in the other fixed head and the lesser bar being mounted movable longitudinally with respect to said other fixed head, and means for controlling the operation of an associated apparatus, said means being carried by said supporting structure and operatively associated with the lesser bar for longitudinal movement thereby in the movement of the longitudinally movable end portion of the latter due to its elongation in excess of that of the greater bar.

2. In the construction defined in claim 1, the supporting structure being a casing open at the lower side and closed at the upper side, whereby it constitutes a hood over the bars for receiving and holding about said bars hot air and gases due to fire in the vicinity of the structure, the bars and said casing being arranged in a generally horizontally extending position.

3. The construction defined in claim 1, the apparatus-controlling means comprising first and second members both carried movably by the supporting structure and normally engaged with each other against relative movement, the first member being operatively associated with the movable end portion of the lesser bar for movement thereby in the elongation of the latter to disengage said first member from the second.

4. A temperature-responsive device comprising a pair of bars of substantial length, said bars being mounted substantially parallel to each other, one of said bars being at least fifty percent greater in cross section than the other; a supporting structure in which both said bars are mounted and held fixed with respect to each other at one point in the length of each bar; a support carried by said structure for the other end of both bars to which support said end of the greater bar is fixed, and by which support the lesser bar is carried in the longitudinal movement due to its elongation; a first movable member carried by the support and operatively associated with the lesser bar for movement thereby relatively to said support; a second movable member carried by the support for automatic movement relatively thereto and releasably connected with the first mentioned bar for preventing said automatic movement, the connection between said members being arranged for release by the movement of the first mentioned member due to the elongation of the lesser bar by temperature rise.

5. A temperature-responsive device comprising a pair of metal bars of substantial length, said bars being mounted substantially parallel to each other, one of said bars being at least fifty percent greater in cross section than the other; a supporting structure in which both said bars are mounted and held fixed with respect to each other at one end of both bars; a support carried by said structure for the other end of both bars to which support said end of the greater bar is fixed, and by which support the lesser bar is carried in the movement of elongation, and a member carried by the support in a manner permitting automatic movement of said member relatively to the support; a second member carried by the support movable relatively thereto and operatively associated with said lesser bar for deriving movement from the movement of elongation of the latter, said second member being normally disengageably engaged with said automatically movable member preventing the automatic movement of the latter and arranged to be disengaged for releasing said member by the movement derived from the elongation of said lesser bar.

6. A temperature-responsive device comprising a pair of metal bars of substantial length, said bars being mounted substantially parallel to each other, one of said bars being at least fifty percent greater in cross section than the other; a supporting structure in which both of said bars are mounted and held fixed with respect to each other at one end of both bars, said structure comprising a support for the other end of both bars to which support said other end of the greater bar is fixed and with respect to which the lesser bar is free to move longitudinally while supported thereby; a member carried by the supporting structure operatively associated with the lesser bar for movement relatively to the support by the movement of the free end of said lesser bar due to its elongation, and an automatically movable device arranged to be held releasably in fixed position by said member and adapted to be released from said fixed position by the movement of said member due to the elongation of the lesser bar.

7. In a temperature-responsive device comprising a pair of metal bars of substantial length, said bars being mounted substantially parallel to each other, one of said bars being at least fifty percent greater in cross section than the other; a supporting structure in which both said bars are mounted and held fixed with respect to each other at one end of both bars; a support carried by said structure for the other end of both bars to which support said end of the greater bar is fixed, and by which support the lesser bar is carried slidingly; a latch device pivotally mounted and operatively associated with said lesser bar so as to be moved upon a sudden rise in temperature, due to the more rapid elongation of the lesser bar; a weighted lever arranged to be held by engagement of said latch, the movement of said pivoted member due to said elongation being in the direction for disengaging the latch to release the weighted lever.

EMIL TYDEN.